(12) United States Patent
Tian et al.

(10) Patent No.: US 12,424,922 B2
(45) Date of Patent: Sep. 23, 2025

(54) POWER SUPPLY DEVICE, CIRCUIT CONTROL METHOD, AND POWER SUPPLY SYSTEM

(71) Applicants: GUANGDONG OPPO MOBILE TELECOMMUNICATIONS CORP., LTD., Guangdong (CN); POWERLAND TECHNOLOGY INC., Jiangsu (CN)

(72) Inventors: Chen Tian, Guangdong (CN); Jingpeng Zhu, Jiangsu (CN); Jialiang Zhang, Guangdong (CN); Ming Xu, Jiangsu (CN)

(73) Assignees: GUANGDONG OPPO MOBILE TELECOMMUNICATIONS CORP., LTD., Guangdong (CN); POWERLAND TECHNOLOGY INC., Jiangsu (CN)

( * ) Notice: Subject to any disclaimer, the term of this patent is extended or adjusted under 35 U.S.C. 154(b) by 447 days.

(21) Appl. No.: 18/147,907

(22) Filed: Dec. 29, 2022

(65) Prior Publication Data

US 2023/0170783 A1 Jun. 1, 2023

Related U.S. Application Data

(63) Continuation of application No. PCT/CN2021/108765, filed on Jul. 27, 2021.

(30) Foreign Application Priority Data

Sep. 30, 2020 (CN) .......................... 202011066558.1

(51) Int. Cl.
*H02M 3/335* (2006.01)
*H02J 7/02* (2016.01)
(Continued)

(52) U.S. Cl.
CPC ............. *H02M 1/0067* (2021.05); *H02J 7/02* (2013.01); *H02M 3/33569* (2013.01); *H02J 2207/20* (2020.01); *H02M 3/01* (2021.05)

(58) Field of Classification Search
CPC .. H02M 1/0067; H02M 1/007; H02M 1/0083; H02M 3/33569; H02M 3/33571;
(Continued)

(56) References Cited

U.S. PATENT DOCUMENTS

2014/0112029 A1* 4/2014 Lin .................... G05F 1/563
363/21.12
2019/0036442 A1 1/2019 Oh
(Continued)

FOREIGN PATENT DOCUMENTS

CN 107769304 A 3/2018
CN 109599924 A 4/2019
(Continued)

OTHER PUBLICATIONS

Valipour et al. "Electrolytic capacitor-less AC-DC LED driver with constant output current and PFC," The 6th International Power Electronics Drive Systems and Technologies Conference (PEDSTC2015), Feb. 2015.
(Continued)

*Primary Examiner* — Nguyen Tran
(74) *Attorney, Agent, or Firm* — Hodgson Russ LLP

(57) ABSTRACT

A power supply device includes: an input rectifier circuit configured to convert a received alternating-current power into a first pulsating direct-current voltage; a first-stage conversion circuit connected with the input rectifier circuit and configured to convert the first pulsating direct-current voltage into a second pulsating direct-current voltage; a valley-fill circuit connected with the first-stage conversion circuit and configured to supply, in response to a voltage
(Continued)

value of the second pulsating direct-current voltage being lower than a voltage threshold, electrical power to thereby enable the voltage value of the second pulsating direct-current voltage to be greater than or equal to the voltage threshold; and a second-stage conversion circuit connected with the first-stage conversion circuit and configured to convert the second pulsating direct-current voltage into a constant direct-current voltage and output the constant direct-current voltage.

19 Claims, 3 Drawing Sheets

(51) Int. Cl.
*H02M 1/00* (2006.01)
*H02M 3/00* (2006.01)

(58) Field of Classification Search
CPC ......... H02M 3/33573; H02M 3/33592; H02M 3/3376; H02M 3/3374; H02M 3/01; H02J 7/02; H02J 7/04; H02J 2207/20
See application file for complete search history.

(56) References Cited

U.S. PATENT DOCUMENTS

| | | | |
|---|---|---|---|
| 2019/0103815 A1* | 4/2019 | Brenguier | H02M 3/04 |
| 2020/0153178 A1 | 5/2020 | Zhang et al. | |
| 2022/0037074 A1* | 2/2022 | Tashiro | H02M 3/33576 |

FOREIGN PATENT DOCUMENTS

| | | |
|---|---|---|
| CN | 110350799 A | 10/2019 |
| DE | 4441214 | 3/1997 |
| DE | 102015115481 | 3/2017 |

OTHER PUBLICATIONS

EPO, Extended European Search Report for EP Application No. 21874008.2, Jan. 17, 2024.
EPO, Communication for EP Application No. 21874008.2, Aug. 19, 2024.
WIPO, International Search Report for International Application No. PCT/CN2021/108765, Oct. 29, 2021.
CNIPA, First Office Action for CN Application No. 202011066558.1, Sep. 3, 2021.
CNIPA, Second Office Action for CN Application No. 202011066558.1, Mar. 18, 2022.
CNIPA, Third Office Action for CN Application No. 202011066558.1, Sep. 5, 2022.
CNIPA, Office Action issued for CN Application No. 202011066558.1, Nov. 2, 2022.

* cited by examiner

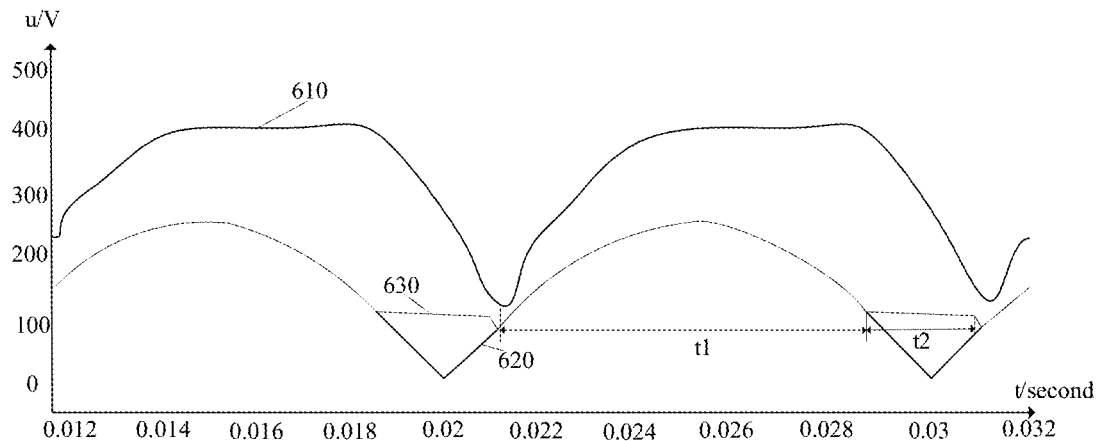

FIG. 6

```
controlling, in response to a valley voltage value of the pulsating direct-     710
current voltage output by the first-stage conversion circuit being less than or
equal to the voltage threshold, the valley-fill circuit to supply the electrical
power to thereby enable the valley voltage value of the pulsating direct-
current voltage ouput by the first-stage conversion circuit to be greater than
            or equal to the voltage threshold
```

```
controlling, in response to the valley voltage value of the pulsating direct-   720
current voltage output by the first-stage conversion circuit being greater than
the voltage threshold, the valley-fill circuit to stop supplying the electrical
                              power
```

FIG. 7

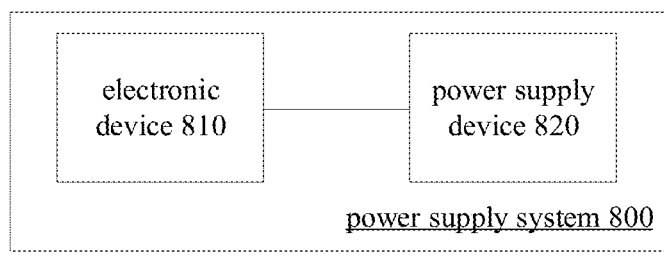

FIG. 8

POWER SUPPLY DEVICE, CIRCUIT CONTROL METHOD, AND POWER SUPPLY SYSTEM

CROSS REFERENCE TO RELATED APPLICATIONS

This application is a continuation of International Application No. PCT/CN2021/108765 filed on Jul. 27, 2021, which claims priority to Chinese Patent Application No. 202011066558.1, filed on Sep. 30, 2020, the entire disclosures of the above-mentioned applications are incorporated herein by reference.

TECHNICAL FIELD

Embodiments of the disclosure relate to the field of power conversion technology, and in particularly to a power supply device, a circuit control method, and a power supply system.

BACKGROUND

Electronic devices, such as mobile terminals, bring convenience to users in daily life, but cause obstacles to use due to the need for frequent charging.

In the related art, a power supply device has a large volume, which makes it inconvenient to carry the power supply device and charge the electronic devices at any time.

The above information disclosed in the background section is illustrative and is only intend to enhance understanding of the background of the disclosure and does not constitute prior art information that is already known to those skilled in the art.

SUMMARY

Embodiments of the disclosure provide a power supply device, a circuit control method, and a power supply system. The technical solutions are as follows.

According to an aspect of the disclosure, a power supply device is provided. The power supply device includes:
  an input rectifier circuit configured to convert a received alternating-current power into a first pulsating direct-current voltage;
  a first-stage conversion circuit connected with the input rectifier circuit, in which the first-stage conversion circuit is configured to convert the first pulsating direct-current voltage into a second pulsating direct-current voltage;
  a valley-fill circuit connected with the first-stage conversion circuit, in which the valley-fill circuit is configured to supply, in response to a voltage value of the second pulsating direct-current voltage being lower than a voltage threshold, electrical power to thereby enable the voltage value of the second pulsating direct-current voltage to be greater than or equal to the voltage threshold; and
  a second-stage conversion circuit connected with the first-stage conversion circuit, in which the second-stage conversion circuit is configured to convert the second pulsating direct-current voltage into a constant direct-current voltage and output the constant direct-current voltage.

According to another aspect, a circuit control method applied in the above power supply device is provided. The method includes:
  controlling, in response to a valley voltage value of the pulsating direct-current voltage output by the first-stage conversion circuit being less than the voltage threshold, the valley-fill circuit to supply the electrical power to thereby enable the valley voltage value of the pulsating direct-current voltage output by the first-stage conversation circuit to be greater than or equal to the voltage threshold;
  controlling, in response to the valley voltage value of the pulsating direct-current voltage output by the first-stage conversation circuit being greater than the voltage threshold, the valley-fill circuit to stop supplying the electrical power.

According to yet another aspect, a power supply system is provided. The power supply device includes an electronic device and the power supply device provided by the embodiments of the disclosure. The power supply device is configured to supply electrical power to the electronic device. In a possible scenario, the electronic device operates directly with the electrical power supplied by the power supply device. In another possible scenario, the electronic device charges a battery with the electrical power supplied by the power supply device. Alternatively, the electronic device may shunt the electrical power supplied by the power supply device, a part of the electrical power is used for normal operation, and the other part of the electrical power is charged into the battery.

BRIEF DESCRIPTION OF THE DRAWINGS

In order to more clearly illustrate technical solutions in embodiments of the disclosure, drawings used in the description of the embodiments will be briefly described below. Apparently, the drawings in the following description are merely some embodiments of the disclosure. For those skilled in the art, other drawings may also be obtained according to these drawings without paying any creative work.

FIG. 6 is a simulation waveform diagram based on the embodiment illustrated in FIG. 5;

FIG. 7 is a schematic flowchart of a circuit control method according to an exemplary embodiment of the disclosure; and FIG. 8 is a schematic block diagram of a power supply system according to an exemplary embodiment of the disclosure.

DETAILED DESCRIPTION OF EMBODIMENTS

Figure 1:
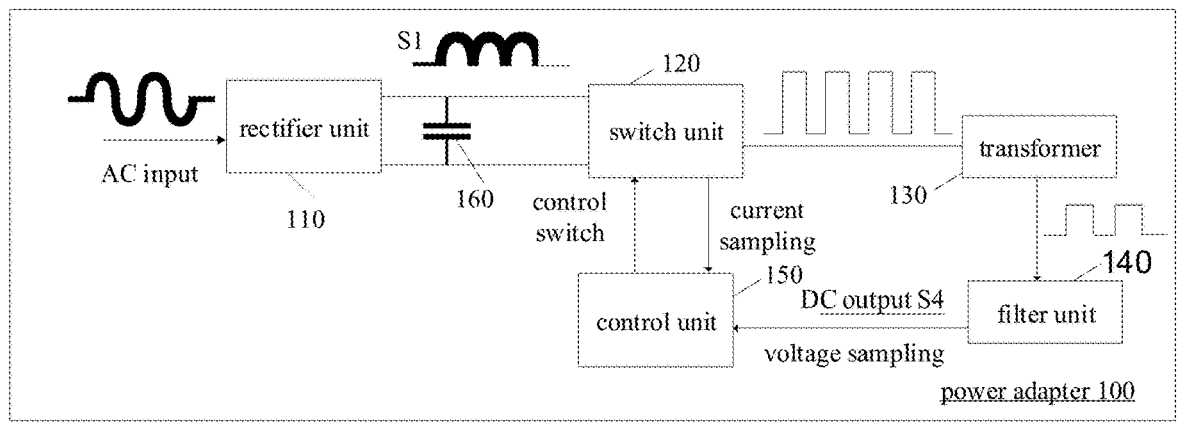
FIG. 1 is a schematic structural diagram of a power supply device in the related art.

To make objectives, technical solutions, and advantages of the disclosure clear, implementations of the disclosure will be further described in detail with reference to the drawings.

In the following description refers to the drawings, the same numerals in different drawings indicate the same or similar elements, unless otherwise indicated. The implementations described in the following exemplary embodiments are not representative of all implementations consistent with the disclosure. Instead, the implementations are only examples of devices and methods consistent with some aspects of the disclosure as detailed in the appended claims.

In the description of the disclosure, terms, such as "first", "second", etc., are merely used for descriptive purposes and are not intended to be construed as indicating or implying relative importance. In the description of the disclosure, it should be noted that, unless otherwise expressly specified and limited, terms "connected" and "connection" should be understood broadly, for example, as fixed connection, as removable connection, or as integrally connection; as mechanical connection, as electrical connection, or as communication connection; as direct connection, as indirect connection through an intermediate medium. For those skilled in the art, specific meanings of the above terms in the disclosure may be understood according to specific conditions. In description of the disclosure, "a plurality of or multiple" means two or more than two. A term "and/or" is used to describe an association of related objects, and indicates that three relationships may exist, for example, "A and/or B" may indicate the presence of A alone, B alone, and both A and B. The character "/" generally indicates that the related objects before and after the character are in an "or" relationship.

The embodiments of the disclosure provide technical solutions as follows.

A power supply device, including:
an input rectifier circuit configured to convert a received alternating-current power into a first pulsating direct-current voltage;
a first-stage conversion circuit connected with the input rectifier circuit, in which the first-stage conversion circuit is configured to convert the first pulsating direct-current voltage into a second pulsating direct-current voltage;
a valley-fill circuit connected with the first-stage conversion circuit, in which the valley-fill circuit is configured to supply, in response to a voltage value of the second pulsating direct-current voltage being lower than a voltage threshold, electrical power to thereby enable the voltage value of the second pulsating direct-current voltage to be greater than or equal to the voltage threshold; and
a second-stage conversion circuit connected with the first-stage conversion circuit, in which the second-stage conversion circuit is configured to convert the second pulsating direct-current voltage into a constant direct-current voltage and output the constant direct-current voltage.

In at least one alternative embodiment, the first-stage conversion circuit includes a switch unit (also referred to as a switch circuit) and a voltage transformation unit (also referred to as a voltage transformation circuit); and
the voltage transformation unit is configured to convert the first pulsating direct-current voltage that has been performed with chopper processing by the switch unit of the first-stage conversion circuit into the second pulsating direct-current voltage.

In at least one alternative embodiment, the valley-fill circuit includes an energy storage unit (also referred to as an energy storage circuit) and a switch unit (also referred to as a switch circuit);

the energy storage unit is connected with two terminals of a secondary winding of the voltage transformation unit and is configured to obtain electrical power supplied by the voltage transformation unit; and
the switch unit of the valley-fill circuit is configured to perform chopper processing on a voltage output by the energy storage unit.

In at least one alternative embodiment, the voltage transformation unit is disposed in a transformer, two sides of the transformer are provided with respective isolation plates, and the isolation plates are configured to divide physical spaces for the transformer and other components.

In at least one alternative embodiment, the first-stage conversion circuit includes at least one filter capacitor, and a capacitance of the filter capacitor is less than a preset capacitance.

In at least one alternative embodiment, the valley-fill circuit further includes a first diode, a second diode and an inductor;
the first diode is connected between a terminal of the secondary winding and an input terminal of the energy storage unit and configured to perform half-wave rectification on a voltage signal input by the secondary winding;
the second diode is a freewheeling diode; and
the inductor is connected between the switch unit of the valley-fill circuit and an output terminal of the first-stage conversion circuit and configured to form a first filter circuit with the filter capacitor, and the first filter circuit is configured to filter the voltage performed with the chopper processing.

In at least one alternative embodiment, the filter capacitor is connected with an output terminal of the first-stage conversion circuit.

In at least one alternative embodiment, the filter capacitor includes at least one selected from the group consisting of: a film capacitor, a ceramic capacitor, a tantalum capacitor and an electrolytic capacitor.

In at least one alternative embodiment, the input rectifier circuit is connected with an external alternating-current input, and the external alternating-current input is configured to input the alternating-current power to the power supply device.

In at least one alternative embodiment, a connection of the input rectifier circuit with the external alternating-current input is a three-phase port or a two-phase port.

In at least one alternative embodiment, the second-stage conversion circuit is connected with a first port of a matched cable, and the cable is configured to supply the constant direct-current power to outside through a second port thereof.

In at least one alternative embodiment, the first port includes a universal serial bus (USB) port.

In at least one alternative embodiment, the cable is provided with a power management chip, and the power management chip is configured to manage power of a current flowing through the cable.

In at least one alternative embodiment, the second port includes one selected from the group consisting of: a Type-C interface, a micro-USB interface and a lightning interface.

In at least one alternative embodiment, the power supply device includes three layers of printed circuit boards (PCBs) respectively being a first PCB, a second PCB and a third PCB;
the first PCB is configured to connect with the voltage transformation unit;

the second PCB is provided with an output terminal of the second-stage conversion circuit, and the second PCB is arranged at a spatial position between the first PCB and the third PCB; and the third PCB is a main board of the power supply device.

In at least one alternative embodiment, the filter capacitor is connected on the first PCB or the filter capacitor is connected on the third PCB, and the second PCB is hollow at a space occupied by the filter capacitor, when a size of the filter capacitor is larger than a threshold.

The power supply device provided by the disclosure, by adopting the valley-fill circuit rather than using an electrolytic capacitor or other large-capacity capacitors, enables the second-stage conversion circuit to have a sufficiently high valley voltage, thereby ensuring the stability of the overall output voltage of the power supply device. In addition, the power supply device can improve the through voltage while reduce a size of a magnetic unit in the second-stage conversion circuit, thereby improving efficiency and power density of the power supply device. The power supply device can have a small volume and supply a direct-current output having a stable waveform.

In order to provide a thorough understanding, terms involved in the embodiments of the disclosure are introduced below.

An alternating-current voltage is commercial power input into the power supply device in the embodiments of the disclosure. An instantaneous value of the alternating-current voltage may be a value of the alternating-current voltage.

A pulsating direct-current voltage is an electrical signal output by the first-stage conversion circuit in the embodiments of the disclosure, and a value of the electrical signal is a voltage value of the pulsating direct-current voltage. Without the intervention of the valley-fill circuit, a valley voltage value of the pulsating direct-current voltage approaches 0 or be equal to 0.

A common power supply device in the art is usually provided with a bulky energy storage unit to store electrical power. Thus, the bulky energy storage unit results in a large volume of the power supply device.

Referring to FIG. 1, FIG. 1 is a schematic structural diagram of a power supply device in the related art. As illustrated in FIG. 1, the power supply device 100 includes a rectifier unit 110, a switch unit 120, a transformer 130, a filter unit 140, a control unit 150 and an energy storage unit 160.

It should be noted that the power supply device 100 as a whole has a function of converting the commercial power which is an alternating-current (AC) voltage into a direct-current (DC) voltage in a specified form. On the basis of that, the disclosure will introduce the function of each unit in the operation of the power supply device 100 as follows.

The rectifier unit 110 is configured (i.e., structured and arranged) to rectify an AC voltage received by the power supply device 100. A voltage S1 that has been rectified by the rectifier unit 110 is a pulsating DC voltage, and details may refer to FIG. 1.

After the power supply device 100 obtains the voltage S1, the switch unit 120, the transformer 130 and the filter unit 140 will convert the voltage S1. As such, the pulsating DC voltage S1 is converted into a stable DC—S4. Specifically, a part of the voltage S1 will be charged to the energy storage unit 160, which is usually an electrolytic capacitor. The voltage S1 is filtered by the electrolytic capacitor to obtain a DC voltage with less fluctuation. The electrolytic capacitor uses the energy stored therein to maintain a stable output voltage, when a low AC input voltage is input to the electrolytic capacitor.

The control unit 150 samples a voltage output by the power supply device 100 and samples a current of the switch unit 120 respectively, thereby acquiring a voltage sampling signal and a current sampling signal. In addition, the control unit 150 controls, based on the voltage sampling signal and the current sampling signal, a switch mode and durations for opening and closing the switch unit 120 of the switch unit 120, thereby controlling the output voltage and/or the output current of the power supply device 100.

In at least one alternative embodiment, the power supply device may be a power adapter.

However, in the field of power conversion technology, the bulky electrolytic capacitor results in the large volume of the power supply device, which makes the power supply device not portable for the user. When the user carries the power supply device, the power supply device takes large space, which prevents the user from carrying other objects. When the user gives up carrying the power supply device because of the large volume, the electronic device will not be charged in time and cannot be used continuously.

Figure 2:
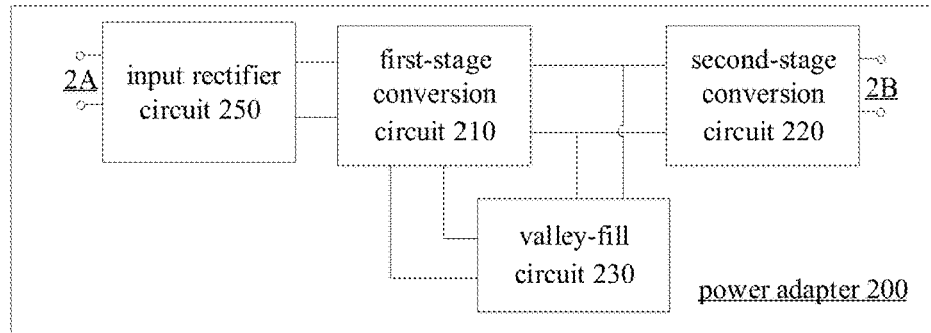
FIG. 2 is a schematic structural diagram of a power supply device including a two-stage architecture according to an embodiment of the disclosure.

In the disclosure, the following technical solutions are adopted to reduce the volume of the power supply device. In the illustrated design, a power supply device including a two-stage architecture is provided. Referring to FIG. 2, FIG. 2 is a schematic structural diagram of a power supply device including a two-stage architecture according to an embodiment of the disclosure.

As illustrated in FIG. 2, the power supply device 200 includes a first-stage conversion circuit 210, a second-stage conversion circuit 220, a valley-fill circuit 230, an input terminal 2A, an output terminal 2B and an input rectifier circuit 250.

In the embodiments of the disclosure, the input rectifier circuit 250 is configured to convert received AC power into a first pulsating DC voltage. Specifically, the input rectifier circuit 250 may be a rectifier bridge BD1 configured to connect with commercial power. In this technical field, the commercial power is usually in a form of AC voltage, and a voltage and a frequency of the AC voltage are different in different regions. For example, in a current technical development scenario, the voltage of the commercial power ranges from 100V to 240V, and the frequency of the commercial power ranges from 50 Hz to 60 Hz. For example, the first-stage conversion circuit 210 may be a DCX circuit.

The first-stage conversion circuit 210 receives the first pulsating DC voltage output by the rectifier bridge BD1, and converts the first pulsating DC voltage into a second pulsating DC voltage. It should be noted that, the minimum value of the second pulsating DC voltage output by the first-stage conversion power supply 210 alone is close to 0 or equal to 0. Specifically, the first-stage conversion circuit 210 is configured to perform an efficient isolation conversion on the first pulsating DC voltage. The isolation conversion may be a boost conversion, a buck conversion or other conversions, which may be set according to specific design parameters.

It should be noted that, in the embodiments of the disclosure, there is no electrolytic capacitor disposed in the first-stage conversion circuit 210, and the stable output voltage is enabled without using the electrolytic capacitor. The first-stage conversion circuit 210 is provided with a unit for boosting the input AC voltage, so that the first-stage converter circuit 210 can provide a bus voltage within a similar range at the output terminal regardless of the input AC voltage being in a low-voltage range or a high-voltage range, thereby providing voltage support for the output voltage. In addition, it is not necessary to provide a large volume electrolytic capacitor in the power supply device with the valley-fill circuit. The power supply device may be provided with a film capacitor, a ceramic capacitor, a tantalum capacitor, or a small volume electrolytic capacitor, thereby reducing the volume of the power supply device. It should be noted that the capacitor may also be other types, which is not limited in the embodiments of the disclosure.

The above structure removes the electrolytic capacitor in the solutions provided by the embodiments of the disclosure, the minimum value of the second pulsating DC voltage output by the original first-stage conversion circuit 210 is close to 0, and the amplitude of the voltage jitter is too large for the subsequent circuit to output the constant DC power. It should be noted that an input voltage value of the second-stage conversion circuit 220 is equal to an output voltage value of the first-stage conversion circuit 210.

On this basis, the disclosure achieves the effect that the minimum value of the input voltage of the second converter circuit is greater than a voltage threshold by adding a valley-fill circuit arranged at the input terminal of the second-stage conversion circuit. Regarding a waveform of the pulsating DC voltage, a valley portion output by the second-stage conversion circuit 220 maintains at the value of the voltage threshold under the action of the valley-fill circuit. In other words, the valley portion of the pulsating DC voltage is filled. Thus, the valley-fill circuit in the power supply device provided by the disclosure, has a function of filling the valley voltage of the pulsating DC voltage.

On this basis, the second-stage conversion circuit 220 connected with the first-stage conversion circuit 210 is configured to convert the pulsating DC voltage output by the first-stage conversion circuit 210 to obtain the constant DC voltage, and output the constant DC power to meet power demands of various electronic devices.

In at least one possible scenario, the electronic device is provided with a preprocessing circuit. The preprocessing circuit is configured to receive an electrical signal input by the power supply device into the electronic device. When only a constant DC voltage can be received by the preprocessing circuit, the power supply device of the disclosure can supply the electronic device with available and stable electrical power, ensuring that the electronic device can be charged with the electrical power in time.

An actual assembly of the power supply device may further include a drive circuit, a voltage detection circuit, a current detection circuit and a microprogrammed control unit (MCU) control circuit.

For example, when the power supply device is not provided with the electrolytic capacitor to reduce the volume, it requires a corresponding electronic device to be able to receive the pulsating DC power. In this scenario, the power supply device that has reduced the volume can only charge the electronic device capable of receiving the pulsating DC voltage. When traveling, studying or on being on a business trip, the user usually carries various electronic devices such as a smartphone, a tablet and a laptop. Each of the above-mentioned electronic devices requires a corresponding power supply device for charging. Thus, the user needs to carry a large quantity of power supply devices, which take up a large space. The power supply device that has reduced the volume is able to charge only a particular one of the above electronic devices. For example, the power supply device that has reduced the volume is able to charge a smartphone, which has been correspondingly designed to receive and use the pulsating DC power. However, it is possible that some of the various electronic devices used by the user are not manufactured based on a standard of the power supply device that has reduced the volume. Thus, the disclosure designs the power supply device capable of outputting the constant DC voltage while reducing the volume of the power supply device. When the voltage output by the power supply device that has reduced the volume is the constant DC voltage, the user may charge the multiple electronic devices through the power supply device, so that the user may carry only the small-volume power supply device to meet the needs of charging the multiple carried electronic devices.

It should be noted that, based on the power adapter 200 illustrated in FIG. 2, the voltage transformation unit may be disposed in a transformer, two sides of the transformer are provided with respective isolation plates, and the isolation plates are configured to divide physical spaces for the transformer and other components.

In at least one alternative embodiment, the input rectifier circuit is connected with the external alternating-current input, and obtains the AC power from the port of the external alternating-current input. In some other possible embodiments, a connection of the input rectifier circuit with the external alternating-current input is a three-phase port or a two-phase port.

In at least one alternative embodiment, the second-stage conversion circuit is connected with a first port of a matched cable at the output terminal of the power adapter 200, and the cable is configured to supply constant DC power to outside through a second port of the cable. For example, the matched cable may be a data cable.

In at least one alternative embodiments, the first port includes a universal serial bus (USB) port. The cable includes a power management chip, and the power management chip is configured to manage power of a current flowing through the cable. The second port includes one selected from the group consisting of: a Type-C interface, a micro-USB interface and a lightning interface.

In at least one alternative embodiment, the power supply device includes three layers of printed circuit boards (PCBs), the three layer of PCBs are a first PCB, a second PCB and a third PCB, respectively; the first PCB is configured to be connected with the voltage transformation unit; the second PCB is provided with the output terminal of the second-stage conversion circuit, and the second PCB is arranged at a spatial position between the first PCB and the third PCB; and the third PCB is a main board of the power supply device.

In at least one alternative embodiment, the filter capacitor is connected on the first PCB, or the filter capacitor is connected on the third PCB, and the second PCB is hollow at a space occupied by the filter capacitor, when a size of the filter capacitor is larger than a threshold. Specifically, the threshold may be one of a volume threshold, a height threshold, or other size thresholds, which is not limited in the disclosure.

In the power supply device provided by the disclosure, at least one filter capacitor may be further added to the first-stage conversion circuit. It should be noted that the capacitance of the filter capacitor may be freely adjusted according to design requirements. In a possible implementation, when there are at least two filter capacitors, the at least two filter capacitors may be connected in parallel and arranged at the output of the first-stage conversion circuit.

Figure 3:
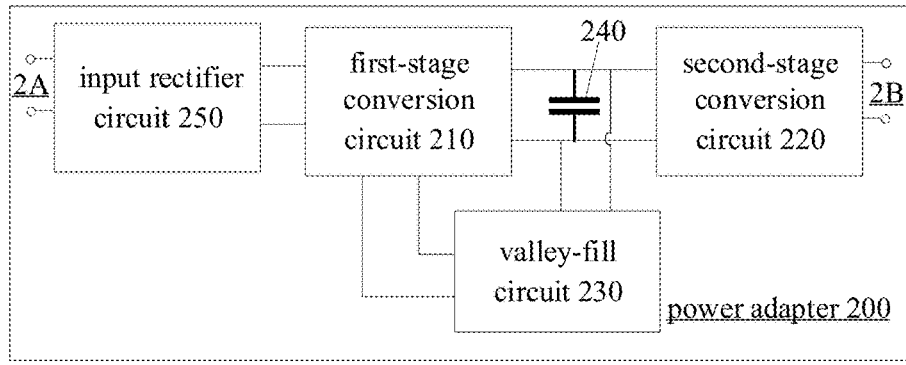
FIG. 3 is a schematic structural diagram of a power supply device according to another embodiment of the disclosure.

Referring to FIG. 3, FIG. 3 is a schematic structural diagram of a power supply device according to another embodiment of the disclosure. As illustrated in FIG. 3, the power supply device includes the first-stage conversion circuit 210, the second-stage conversion circuit 220, a filter capacitor 240 and the input rectifier circuit 250.

Specifically, the functions of the first-stage conversion circuit 210 and the second-stage conversion circuit 220 are the same as those illustrated in FIG. 2, and details will not be repeated here.

The filter capacitor 240 is connected with the output terminal of the first-stage conversion circuit 210. In other words, the filter capacitor 240 is connected with the input terminal of the second-stage conversion circuit 220. Specifically, the capacitance of the filter capacitor is smaller than a preset capacitance.

It should be noted that, the preset capacitance is a capacitance value of a capacitor with a same filtering capability. When the capacitance value of the filter capacitor is small, the volume of the filter capacitor is reduced accordingly.

Figure 4:
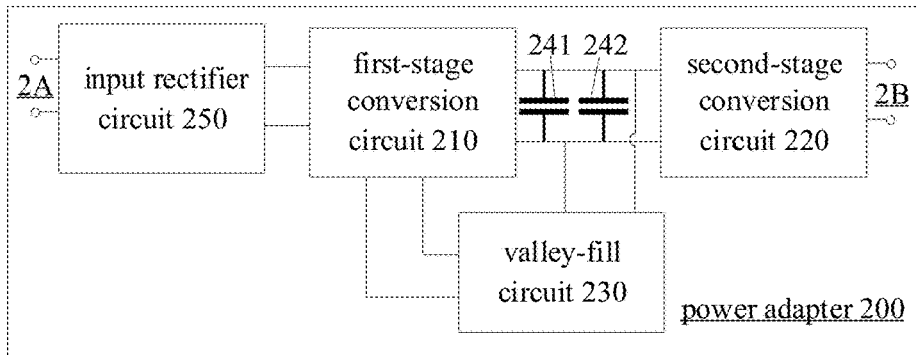
FIG. 4 is a schematic structural diagram of a power supply device based on the embodiment illustrated in FIG. 3.

Similarly, referring to FIG. 4, FIG. 4 is a schematic structural diagram of a power supply device based on the embodiment illustrated in FIG. 3. As illustrated in FIG. 4, the power supply device includes the first-stage conversion circuit 210, the second-stage conversion circuit 220, a first filter capacitor 241, and a second filter capacitor 242. It should be noted that, the first filter capacitor 241 and the second filter capacitor 242 arranged in parallel may be replaced by providing a single capacitor as illustrated in FIG. 3. Based on a space for disposing the capacitor and a circuit layout, a designer may select one of the setting manners respectively illustrated in FIG. 3 and FIG. 4 as an actual required filter capacitor arrangement.

It should be noted that, FIG. 3 illustrates the filter capacitor arrangement in which only one filter capacitor is provided in the power supply device. FIG. 4 illustrates another filter capacitor arrangement in which multiple filter capacitors are provided in the power supply device. When it requires to dispose two or more filter capacitors in the power supply device, the power supply device may arrange the multiple filter capacitors connected in parallel between the first-stage conversion circuit 210 and the second-stage conversion circuit 220.

For example, when the designer needs to set N filter capacitors, the designer may arrange, based on the design illustrated in FIG. 4, N−1 filter capacitors connected in parallel between two terminals of the first filter capacitor 241, so that there are N filter capacitors connected in parallel between two ends of the input terminal of the second-stage conversion circuit 220.

For example, the filter capacitor may be implemented as one selected from the group consisting of: a film capacitor, a multi-layer ceramic capacitor (MLCC), a chip capacitor, and an electrolytic capacitor. In the embodiments of the disclosure, the filter capacitor may be set as the MLCC.

Figure 5:
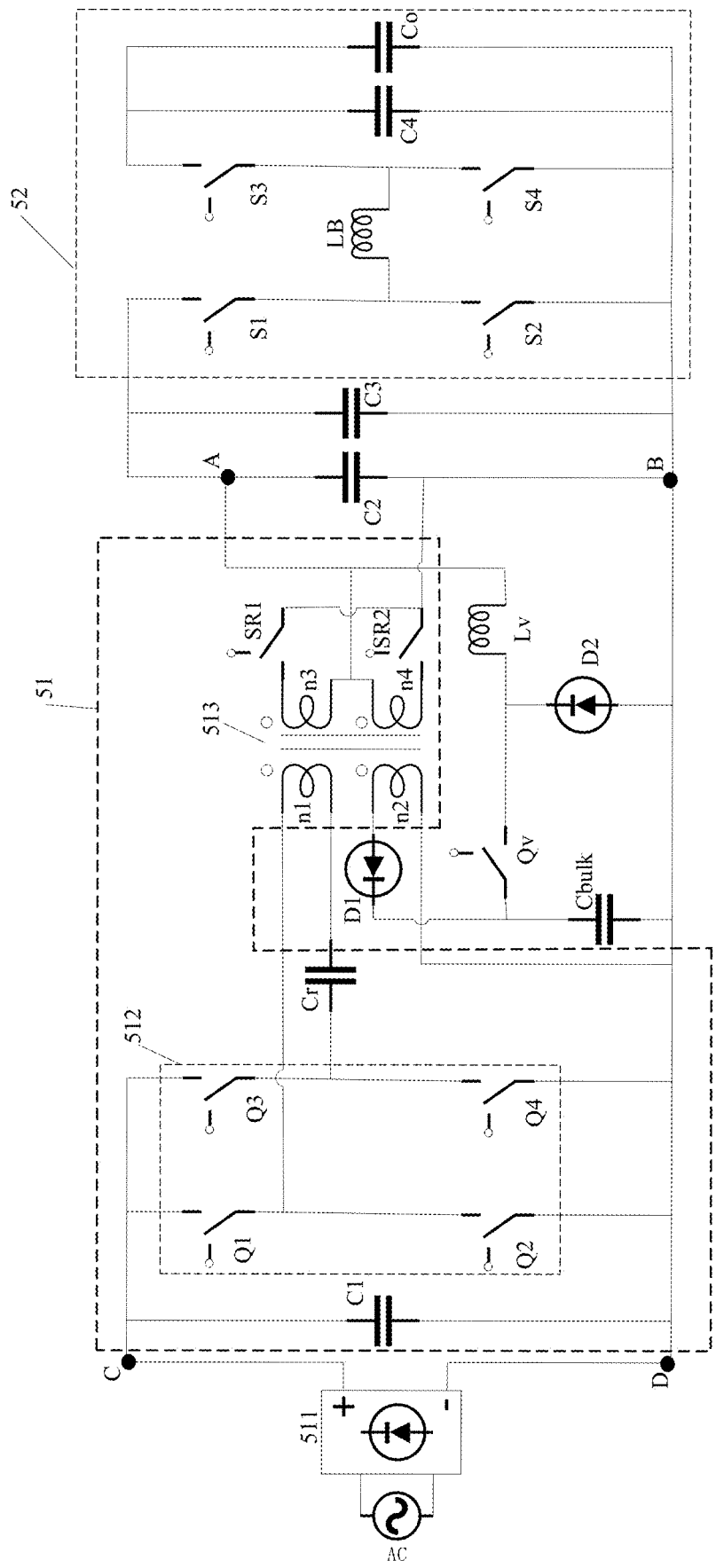
FIG. 5 is a schematic principle diagram of a power supply device according to still embodiment of the disclosure.

Referring to FIG. 5, FIG. 5 is a schematic principle diagram of a power supply device according to still embodiment of the disclosure. As illustrated in FIG. 5, the power supply device includes a rectifier unit 511, a first-stage conversion circuit 51, a second-stage conversion circuit 52, and a valley-fill circuit. It should be noted that the components included in the first-stage conversion circuit 51 and the second-stage conversion circuit 52 are illustrated by dashed-line boxes, and the valley-fill circuit is an electrical path connected between an electrical connection point A and an electrical connection point B and further connected with a secondary winding n2.

First, the rectifier unit 511 is configured to receive AC power, and the AC power may be an input of the power supply device. In other words, the AC power may be commercial power which obtains by the power supply device from a socket through a plug. After the rectifier unit 511 obtains the commercial power, the rectifier unit may convert the AC voltage into a first pulsating DC voltage. It should be noted that the first pulsating DC voltage may be a voltage between an electrical connection point C and an electrical connection point D illustrated in FIG. 5.

Second, the first-stage conversion circuit 51 includes a switch unit 512, and a voltage transformation unit 513.

(1) The switch unit 512 is configured to connect with the rectifier unit 511 and the voltage transformation unit 513. As illustrated in FIG. 5, the switch unit 512 includes a first switch unit Q1, a second switch unit Q2, a third switch unit Q3, and a fourth switch unit Q4 which are bridge-connected. The switch unit 512 further includes a storage capacitor C1. For example, the storage capacitor C1 has a function of energy storage as well as a function of filtering. It should be noted that the quantity of the storage capacitor C1 may be one. Alternatively, on the basis of providing the storage capacitor C1, multiple storage capacitors may be connected in parallel with the storage capacitor C1.

(2) The voltage transformation unit 513 is configured to convert the first pulsating DC voltage that has been performed with chopper processing by the switch unit 512 into a second pulsating DC voltage. In at least one alternative embodiment of the disclosure, the second pulsating DC voltage is smaller than the first pulsating DC voltage. It should be noted that, the second pulsating DC voltage is a voltage between the electrical connection point A and the electrical connection point B.

Specifically, the voltage transformation unit 513 includes a primary winding n1, a secondary winding n2, a secondary winding n3, a secondary winding n4, and a magnetic core.

A capacitor Cr is provided on a path between the primary winding n1 and the third switch unit Q3, or a path between the primary winding n1 and the fourth switch unit Q4. Specifically, the capacitor Cr is a resonance capacitor. One function of a resonance point is to isolate a DC voltage and prevent the voltage transformation unit 513 from entering a saturated state, and another function of the resonance point is to realize soft switching of the switch units Q1 to Q4 through resonance to thereby reduce losses.

In the illustrated embodiments, the first-stage conversion circuit may be a DC-DC transformer (DCX) circuit, which may compress, through alternating full-bridge and half-bridge operation of switch units Q1 to Q4, a fluctuation range of the first pulsating DC voltage input by the rectifier unit 511.

The secondary winding n3 and the secondary winding n4 are configured to transform the electrical power which is input into the voltage transformation unit 513 by the primary winding n1 to the second-stage conversion circuit 52.

Two terminals of the secondary winding n2 are connected with the valley-fill circuit.

For example, the first-stage conversion circuit illustrated in the embodiments of the disclosure may realize a function of the DC transformer, that is, the first-stage conversion circuit may convert high-voltage pulsating DC power into low-voltage pulsating output. In at least one alternative embodiment, when a voltage fluctuation range is between 90V and 264V, the low-voltage range is from 90Vac to 130Vac, and the high-voltage range is from 180Vac to 264Vac.

For example, when the first-stage conversion circuit adopts an LLC circuit topology, the first-stage conversion circuit may be equivalent as follows. When a switching frequency of a LLC resonant converter is fixed and equal to a resonance frequency, a DC voltage gain of the LLC resonant converter remains unchanged, and the LLC resonant converter may be equivalent to a DC transformer. That is, the DC transformer may be denoted as an LLC-DCX or a DC transformer based on the LLC resonant converter. An optimal operating point of the first-stage conversion circuit refers to a state where the switching frequency is equal to the resonant frequency. Specifically, the first-stage conversion circuit operates at the optimal operating point and can achieve high conversion efficiency.

Third, the valley-fill circuit may include a storage capacitor Cbulk, a switch unit Qv, a first diode D1, a second diode D2 and a first inductor Lv.

It should be noted that, an energy storage power supply includes the storage capacitor Cbulk and a rectifier component, and the rectifier component is configured to perform full-wave or half-wave rectification on the voltage output by the secondary winding n2.

The secondary winding n2 in the voltage transformation unit 513 obtains electrical power through an alternating magnetic field generated by the voltage transformation unit 513. An input terminal of the storage capacitor Cbulk is connected with the secondary winding n2, and the storage capacitor Cbulk is configured to store the electrical power output by the secondary winding. After the valley-fill circuit begins to work, the switch unit Qv performs the chopper processing by switching at high frequency, and a first filter circuit, which is formed by the first inductor Lv and the first filter capacitor C2 or is formed by the first inductor Lv and the second filter capacitor C3, is configured to filter the voltage performed with the chopper processing and output the second pulsating DC voltage with a small pulsation.

In at least one alternative embodiment, the first diode D1 is connected between the secondary winding n2 and the input terminal of the storage capacitor Cbulk and configured to perform half-wave rectification on the voltage input to the valley-fill circuit by the secondary winding n2. Specifically, the second diode D2 is a freewheeling diode (also referred to as flyback diode). The second diode D2 is configured to provide a freewheeling loop for the current of the first inductor Lv. As illustrated in FIG. 5, a terminal of the switch unit Qv is connected with the input terminal of the storage capacitor Cbulk and a negative terminal of the first diode D1, another terminal of the switch unit Qv is connected with a negative terminal of the second diode D2 and a terminal of the first inductor Lv, another terminal of the first inductor Lv is connected with a terminal of the filter capacitor C2, and another terminal of the filter capacitor C2 is connected with another terminal of the storage capacitor Cbulk and a positive terminal of the second diode D2.

In at least one alternative embodiment, the valley-fill circuit may be a Buck circuit, a Boost circuit or any other circuit capable of supplying electrical power to the second-stage conversion circuit. The embodiments of the disclosure are not limited to these examples.

In a practical application scenario, the valley-fill circuit may be connected with the secondary winding n2 to obtain the electrical power, and the first diode D1 performs the half-wave rectification on the electrical power and then the electrical power performed with the half-wave rectification is charged to the storage capacitor Cbulk. The switch unit Qv, the second diode D2 and the first inductor Lv form the buck circuit. When the output voltage of the first-stage conversion circuit is lower than a set value, the buck circuit begins to work, the storage capacitor Cbulk releases the electrical power through the buck circuit, thereby pumping up the output voltage of the first-stage conversion circuit. That is, when the power supply device output constant output power, there is no extreme low input voltage of the second stage converter circuit, so that the second-stage conversion circuit requires a small input current, and the volume of the second inductor LB is reduced correspondingly, which is beneficial to the reduction in the overall volume of the power supply device.

It should be noted that, the first-stage conversion circuit stops transmitting power to the second-stage conversion circuit and the buck circuits maintains all the output power, when the buck circuit works and the voltage output by the first-stage conversion circuit is lower than the voltage output by the buck circuit. Specifically, since there is a diode for rectification in the first-stage conversion circuit, the first-stage conversion circuit stops outputting when the diode is in a reverse cut-off state. In other words, the valley-fill circuit is connected with the first-stage conversion circuit and configured to supply electrical power to enable the voltage value of the pulsating DC voltage to be greater or equal to the voltage value, in response to the voltage value of the pulsating DC voltage output by the first-stage conversion circuit being less than the voltage threshold.

Third, the second-stage conversion circuit 52 includes a fifth switch unit S1, a sixth switch unit S2, a seventh switch unit S3, an eighth switch unit S4, a second inductor LB, a third capacitor C4 and a fourth capacitor Co.

Specifically, the first filter capacitor C2 and the second filter capacitor C3 are both configured to perform filtering processing.

In a possible application scenario, the second-stage conversion circuit 52 is a DC/DC circuit and configured to convert the low-voltage pulsating DC power output by the first-stage conversion circuit into a stable DC output for supplying the electronic device. In the scenario illustrated in FIG. 5, the second-stage conversion circuit 52 adopts a Buck-Boost circuit to transform the input voltage that is higher than, lower than or equal to an output voltage value to a stable output voltage. It should be noted that the structures of the first-stage conversion circuit and the second-stage conversion circuit illustrated in FIG. 5 are only schematic illustrations. The first-stage conversion circuit may also be implemented as other forms of DCX, and the second-stage conversion circuit may also be other DC/DC circuit topologies.

For example, when the circuit illustrated in FIG. 5 operations, the first-stage conversion circuit adopts a working mode of switching forth and back between the full-bridge mode and the half-bridge mode. The first-stage conversion circuit adopts the full-bridge mode, when the current input to the first-stage conversion circuit belongs to the low-voltage range; and the first-stage conversion circuit adopts the half-bridge mode, when the current input to the first-stage conversion circuit belongs to the high-voltage range. Based on the above designed mode, the power supply device to which an input voltage within a wide variation range is input can enable the second-stage conversion circuit to work with an input voltage within a small variation range, which facilitates the optimization of the design of the second-stage conversion circuit.

For example, when the input AC voltage is in the low-voltage range, the first-stage conversion circuit adopts the full-bridge mode and enables the four switch units (i.e., switch tubes) in the circuit to work, and a fixed voltage gain is denoted as Z1, for example. In this scenario, when the input AC voltage is in the high-voltage range, the first-stage conversion circuit adopts the half-bridge mode, and the fixed voltage gain is denoted as Z2 for example. In the disclosure, Z1 is required to be greater than Z2. Since the low-voltage AC power gets the high gain (i.e., the gain of Z1) supported by the full-bridge mode, the voltage range which is finally output by the first-stage conversion circuit may be controlled to be within a relatively narrow range.

In order to illustrate how the valleys of the output voltage of the first-stage conversion circuit in the power supply device shown in FIG. 5 is filled, the embodiments of the disclosure will be described by using an example illustrated in FIG. 6. FIG. 6 is a simulation waveform diagram based on the embodiment illustrated in FIG. 5. In FIG. 6, a curve 610 is configured to represent the voltage between the two terminals of the storage capacitor Cbulk, a curve 620 is configured to represent the AC rectified voltage without using the valley-fill circuit, and a curve 630 is configured to represent the AC rectified voltage using the valley-fill circuit.

During the time period t1, the valley-fill circuit does not work, the curve 620 and the curve 630 overlap, and the storage capacitor Cbulk is charged to store energy and maintains the voltage. When the output voltage of the first-stage conversion circuit drops to a set value V1, the valley-fill circuit begins to work. During the subsequent time period t2, the energy of the storage capacitor Cbulk passes through the valley-fill circuit to supply power to the first filter capacitor C2 and the second filter capacitor C3, thereby effectively increasing the valley voltage of the voltage output by the first-stage conversion circuit. Since the output voltage of the first-stage conversion circuit is lower than the output voltage of the valley-fill circuit, a body diode of a synchronous rectifier in the first-stage conversion circuit is reversely cut off. When the synchronous tube is not used in the first-stage conversion circuit, the diode in the first conversion circuit is reversely cut off. As illustrated in the change of the curves, the output voltage of the first-stage conversion circuit remains stable, and no longer drops along the curve 620 to close to 0V.

Based on the above, the power supply device provided by the disclosure can enable the input of the second-stage conversion circuit to have a sufficiently high valley voltage without using an electrolytic capacitor or other large-capacity capacitors, thereby ensuring the stability of the overall output voltage of the power supply device. In addition, the power supply device can improve the through voltage and reduce a size of a magnetic unit in the second-stage conversion circuit, thereby improving efficiency and power density of the power supply device.

In at least one alternative embodiment, the valley-fill circuit in the power supply device provided by the disclosure obtains the electrical power through the secondary winding in the voltage transformation unit of the first-stage conversion circuit. Specifically, the storage unit for storing electrical power may adopts a high-voltage ceramic capacitor, or other high-density capacitors for energy storage. The volume of the high-voltage ceramic capacitor may be controlled to be small, and all the new components in the valley-fill circuit may be controlled to be in a small size. Therefore, the power supply device provided by the disclosure can improve the overall power density of the adapter and reduces the volume of the power supply device.

Referring to FIG. 7, FIG. 7 is a schematic flowchart of a circuit control method according to an exemplary embodiment of the disclosure. The circuit control method may be applied to control the above power supply devices. As illustrated in FIG. 7, the circuit control method includes operations as follows.

At operation 710, in response to the valley voltage value of the pulsating DC voltage output by the first-stage conversion circuit being less than or equal to the voltage threshold, the valley-fill circuit is controlled to supply electrical power to thereby enable the valley voltage value of the pulsating DC voltage output by the first-stage conversion circuit to be greater than or equal to the voltage threshold.

In the embodiments of the disclosure, the power supply device may be provided with a component configured to monitor the output voltage of the first-stage conversion circuit, and the component may be a logic circuit or a chip. When the valley voltage value of the pulsating DC voltage output by the first-stage conversion circuit of the power supply device is less than or equal to the voltage threshold, the power supply device controls the valley-fill circuit to supply the electrical power to the output terminal of the first-stage conversion circuit.

At operation 720, in response to the valley voltage value of the pulsating dc voltage output by the first-state conversion circuit being greater than the voltage threshold, the valley-fill circuit is controlled to stop supplying the electrical power.

Correspondingly, the logic circuit or the chip of the power supply device may continuously monitor the output voltage of the first-stage conversion circuit. The valley-fill circuit is controlled to stop supplying the electrical power to the output terminal of the first-stage conversion circuit, in response to the valley voltage value of the pulsating DC voltage output by the first-stage conversion circuit of the power supply device being greater than the voltage threshold.

Based on the above, when the circuit control method provided by the embodiments performed by the power supply device provided by the embodiments of the disclosure, the valley-fill circuit is controlled to supply the electrical power to the output terminal of the first-stage conversion circuit, in response to the valley voltage value of the pulsating DC voltage output by the first-stage conversion circuit of the power supply device being less than or equal to the voltage threshold; and the valley-fill circuit is controlled to stop supplying the electrical power to the output terminal of the first pulsating DC voltage, in response to the valley voltage value of the pulsating DC voltage output by the first-stage conversion circuit of the power supply device being greater than the voltage threshold. Since the power supply device is able to automatically control the operation of the valley-fill circuit, the minimum value of the signal obtained by the second-stage conversion circuit of the power supply device is enabled to be greater than the voltage threshold, which helps the second-stage conversion circuit to process the electrical signal directly to thereby obtain the constant DC power, and facilitates the electronic device to use the electrical power directly. In this way, the power supply device that has reduced the volume can output the constant DC power automatically, which is convenient to provide constant DC power to the electronic device.

Referring to FIG. 8, FIG. 8 is a schematic block diagram of a power supply system according to an exemplary embodiment of the disclosure. The power supply system may include the power supply device and the electronic device provided by the embodiments. As illustrated in FIG. 8, the power supply device 800 includes the electronic device 810 and the power supply device 820.

Specifically, the power supply device 820 may supply electrical power to the electronic device 810 through a wired cable or a wireless induction winding.

For example, the power supply system may be implemented in a scenario where a power adapter charges a smartphone, a tablet computer, a notebook computer, a smart watch, a cleaning robot, smart glasses, a Bluetooth speaker, a Bluetooth headset or a smart bracelet. It should be noted that the above charging scenarios are only exemplary, but are not intend to limit the disclosure.

In at least one alternative embodiment, the power supply device further includes a cable matched with the power supply device, and the cable is configured to connect the power supply device with the electronic device.

In at least one alternative embodiment, the electronic device 810 may be configured to operates with the electrical power supplied by the power supply device, and be further configured to charge the battery with the electrical power supplied by the power supply device. When the electronic device 810 operates with the electrical power supplied by the power supply device, the electronic device may use the electrical power to drive various built-in electronic unit to work, the electronic units may include various power-consuming components, and details will not be described here.

Based on the above, the power supply device provided by the disclosure may provide the electrical power to the electronic device through the power supply device with the reduced volume, while the internal structure of the electronic device is not changed, the space occupied by the power supply device in the power supply device is reduced, and the convenience of charging the electronic device is improved.

The disclosure further provides a computer-readable storage medium. The computer-readable storage medium stores at least one instruction that is loaded and executed by a processor to implement the circuit control method provided by the embodiments of the disclosure. It should be noted that, the above-mentioned circuit control method of the disclosure may also be implemented through a hardware circuit, which is not limited in the embodiments of the disclosure.

The disclosure further provides a computer program product. The computer program product includes computer instructions stored in the computer-readable storage medium. A processor of the computer device reads the computer instructions from the computer-readable storage medium, and the processor executes the computer instructions to cause the computer device to perform the above circuit control method provided by the various alternative implementations. It should be noted that, the above-mentioned circuit control method of the disclosure may also be implemented through a hardware circuit, which is not limited in the embodiments of the disclosure.

It should be noted that the circuit control method executed by the power supply device provided by the above embodiments is illustrated with an example of division of the foregoing functional modules. In actual application, the functions may be allocated to and completed by different functional modules according to requirements, that is, the internal structure of the device is divided into different functional modules, to implement all or some of the contents described above. In addition, the power supply device and the circuit control method provided by the above-mentioned embodiments belong to the same concept, and the specific implementation process of the power supply device refers to the method embodiments, and the details will not be repeated here.

The above serial numbers of the embodiments of the disclosure are only for description, and do not indicate the advantages or disadvantages of the embodiments.

Those skilled in the art may understand that all or some of the operations of the foregoing embodiments may be implemented by hardware, or may be implemented by instructing related hardware through a software. The program may be stored in a computer-readable storage medium. The storage medium may be a ROM, a magnetic disk, or an optical disc, or the like.

The above descriptions are only exemplary embodiments of the disclosure that can be implemented, but are not intended to limit the disclosure. Any modification, equivalent replacement or improvement, etc. made within the spirit and principles of the disclosure falls within the protection scope of the disclosure.

What is claimed is:

1. A power supply device, comprising:
    an input rectifier circuit configured to convert a received alternating-current power into a first pulsating direct-current voltage;
    a first-stage conversion circuit connected with the input rectifier circuit, wherein the first-stage conversion circuit is configured to convert the first pulsating direct-current voltage into a second pulsating direct-current voltage;
    a valley-fill circuit connected with the first-stage conversion circuit, wherein the valley-fill circuit is configured to supply, in response to a voltage value of the second pulsating direct-current voltage being lower than a voltage threshold, electrical power to thereby enable the voltage value of the second pulsating direct-current voltage to be greater than or equal to the voltage threshold; and
    a second-stage conversion circuit connected with the first-stage conversion circuit, wherein the second-stage conversion circuit is configured to convert the second pulsating direct-current voltage into a constant direct-current voltage and output the constant direct-current voltage;
    wherein the first-stage conversion circuit comprises a switch circuit and a voltage transformation circuit, and the voltage transformation circuit is configured to convert the first pulsating direct-current voltage that has been performed with chopper processing by the switch circuit of the first-stage conversion circuit into the second pulsating direct-current voltage;
    wherein the valley-fill circuit comprises an energy storage circuit and a switch circuit; the energy storage circuit is connected with two terminals of a secondary winding of the voltage transformation circuit and configured to obtain electrical power supplied by the voltage transformation circuit; and the switch circuit of the valley-fill circuit is connected with the energy storage circuit and configured to perform chopper processing on a voltage output by the energy storage circuit;
    wherein the power supply device further comprises at least one filter capacitor, the at least one filter capacitor is connected with an output terminal of the first-stage conversion circuit and an input terminal of the second-stage conversion circuit; and
    wherein the valley-fill circuit further comprises a first diode, a second diode and an inductor; the first diode is connected between a terminal of the secondary winding and an input terminal of the energy storage circuit and configured to perform half-wave rectification on a voltage signal input by the secondary winding to obtain a rectified voltage and charge the energy storage circuit with the rectified voltage; the second diode is a freewheeling diode for providing a freewheeling loop for the inductor; and the inductor is connected between the switch circuit of the valley-fill circuit and an output terminal of the first-stage conversion circuit and configured to form a first filter circuit with the at least one filter capacitor, and the first filter circuit is configured to filter the voltage performed with the chopper processing.

2. The power supply device as claimed in claim 1, wherein a capacity of the at least one filter capacitor is less than a preset capacitance.

3. The power supply device as claimed in claim 1, wherein the at least one filter capacitor comprises at least one selected from the group consisting of: a film capacitor, a ceramic capacitor, a tantalum capacitor and an electrolytic capacitor.

4. The power supply device as claimed in claim 3, wherein the input rectifier circuit is connected with an external alternating-current input, and the external alternating-current input is configured to input the alternating-current power to the power supply device.

5. The power supply device as claimed in claim 3, wherein the second-stage conversion circuit is connected with a first port of a matched cable, and the cable is configured to supply the constant direct-current power to outside through a second port thereof.

6. The power supply device as claimed in claim 5, wherein the first port comprises a universal serial bus (USB) port, and the second port comprises one selected from the group consisting of: a Type-C interface, a micro-USB interface and a lightning interface.

7. A circuit control method, applied in a power supply device, the method comprising:
   converting, by an input rectifier circuit, a received alternating-current power into a first pulsating direct-current voltage;
   converting, by a first-stage conversion circuit, the first pulsating direct-current voltage into a second pulsating direct-current voltage;
   controlling, in response to a valley voltage value of the second pulsating direct-current voltage output by the first-stage conversion circuit being less than a voltage threshold, a valley-fill circuit to supply the electrical power to thereby enable the valley voltage value of the second pulsating direct-current voltage output by the first-stage conversion circuit to be greater than or equal to the voltage threshold; and
   converting, by a second-stage conversion circuit, the second pulsating direct-current voltage into a constant direct-current voltage and output the constant direct-current voltage;
   wherein the first-stage conversion circuit comprises a switch circuit and a voltage transformation circuit, and the voltage transformation circuit is configured to convert the first pulsating direct-current voltage that has been performed with chopper processing by the switch circuit of the first-stage conversion circuit into the second pulsating direct-current voltage;
   wherein the valley-fill circuit comprises an energy storage circuit and a switch circuit; the energy storage circuit is connected with two terminals of a secondary winding of the voltage transformation circuit and configured to obtain electrical power supplied by the voltage transformation circuit; and the switch circuit of the valley-fill circuit is connected with the energy storage circuit and configured to perform chopper processing on a voltage output by the energy storage circuit;
   wherein the power supply device further comprises at least one filter capacitor, the at least one filter capacitor is connected with an output terminal of the first-stage conversion circuit and an input terminal of the second-stage conversion circuit; and
   wherein the valley-fill circuit further comprises a first diode, a second diode and an inductor; the first diode is connected between a terminal of the secondary winding and an input terminal of the energy storage circuit and configured to perform half-wave rectification on a voltage signal input by the secondary winding to obtain a rectified voltage and charge the energy storage circuit with the rectified voltage; the second diode is a freewheeling diode for providing a freewheeling loop for the inductor; and the inductor is connected between the switch circuit of the valley-fill circuit and an output terminal of the first-stage conversion circuit and configured to form a first filter circuit with the at least one filter capacitor, and the first filter circuit is configured to filter the voltage performed with the chopper processing.

8. A power supply system, comprising an electronic device and a power supply device, wherein the power supply device is configured to supply electrical power to the electronic device, and the power supply device comprises:
   an input rectifier circuit configured to convert a received alternating-current power into a first pulsating direct-current voltage;
   a first-stage conversion circuit connected with the input rectifier circuit, wherein the first-stage conversion circuit is configured to convert the first pulsating direct-current voltage into a second pulsating direct-current voltage;
   at least one filter capacitor connected with an output terminal of the first-stage conversion circuit and an input terminal of a second-stage conversion circuit;
   a valley-fill circuit connected to the first-stage conversion circuit and the output terminal of the first-stage conversion circuit, wherein the valley-fill circuit is configured to supply, in response to a voltage value of the second pulsating direct-current voltage being less than a voltage threshold, electrical power to the at least one filter capacitor, and stop supplying, in response to the voltage value of the second pulsating direct-current voltage being greater than the voltage threshold, electrical power to the at least one filter capacitor; and
   a second-stage conversion circuit connected with the first-stage conversion circuit, wherein the second-stage conversion circuit is configured to convert the second pulsating direct-current voltage into a constant direct-current voltage and output the constant direct-current voltage;
   wherein the first-stage conversion circuit comprises a switch circuit and a voltage transformation circuit, and the voltage transformation circuit is configured to convert the first pulsating direct-current voltage that has been performed with chopper processing by the switch circuit of the first-stage conversion circuit into the second pulsating direct-current voltage;
   wherein the valley-fill circuit comprises an energy storage circuit and a switch circuit; the energy storage circuit is connected with two terminals of a secondary winding of the voltage transformation circuit and configured to obtain electrical power supplied by the voltage transformation circuit; and the switch circuit of the valley-fill circuit is connected with the energy storage circuit and configured to perform chopper processing on a voltage output by the energy storage circuit; and wherein the valley-fill circuit further comprises a first diode, a second diode and an inductor; the first diode is connected between a terminal of the secondary winding and an input terminal of the energy storage circuit and configured to perform half-wave rectification on a voltage signal input by the secondary winding to obtain a rectified voltage and charge the energy storage circuit with the rectified voltage; the second diode is a free-wheeling diode for providing a freewheeling loop for the inductor; and the inductor is connected between the switch circuit of the valley-fill circuit and an output terminal of the first-stage conversion circuit and configured to form a first filter circuit with the at least one filter capacitor, and the first filter circuit is configured to filter the voltage performed with the chopper processing.

9. The power supply system as claimed in claim 8, further comprising a cable matched with the power supply device, wherein the cable is configured to connect the power supply device with the electronic device.

10. The power supply device as claimed in claim 1, wherein the energy storage circuit is further configured to supply, in response to the voltage value of the second pulsating direct-current voltage being lower the voltage threshold, electrical power to the at least one filter capacitor to thereby enable the voltage value of the second pulsating direct-current voltage to be greater than or equal to the voltage threshold.

11. The power supply device as claimed in claim 10, wherein the energy storage circuit is further configured to stop, in response to the voltage value of the second pulsating direct-current voltage being greater than the voltage threshold, supplying electrical power to the at least one filter capacitor.

12. The power supply device as claimed in claim 1, wherein a terminal of the switch circuit of the valley-fill circuit is connected with the input terminal of the energy storage circuit and a negative terminal of the first diode, another terminal of the switch circuit is connected with a negative terminal of the second diode and a terminal of the inductor, another terminal of the inductor is connected with a terminal of the at least one filter capacitor, and another terminal of the at least one filter capacitor is connected with another terminal of the energy storage circuit and a positive terminal of the second diode.

13. The circuit control method as claimed in claim 7, further comprising:

controlling, in response to the valley voltage value of the second pulsating direct-current voltage output by the first-stage conversion circuit being greater than the voltage threshold, the valley-fill circuit to stop supplying the electrical power.

14. The power supply device as claimed in claim 1, wherein the switch circuit of the first-stage conversion circuit comprises a first switch circuit, a second switch circuit, a third switch circuit, and a fourth switch circuit which are bridge-connected; and a capacitor is provided on a path between a primary winding of the voltage transformation circuit and the third switch circuit, or on a path between the primary winding of the voltage transformation circuit and the fourth switch circuit, and the capacitor serves as a resonance capacitor.

15. The power supply device as claimed in claim 1, wherein the switch circuit of the first-stage conversion circuit comprises a first switch circuit, a second switch circuit, a third switch circuit, and a fourth switch circuit which are bridge-connected; and when an input alternating-current voltage of the received alternating-current power is in a first voltage range, the first-stage conversion circuit operates in a full-bridge mode, and when the input alternating-current voltage is in a second voltage range, the first-stage conversion circuit operates in a half-bridge mode, wherein a minimum voltage value of the second voltage range is greater than a maximum voltage value of the first voltage range.

16. The power supply system as claimed in claim 8, wherein the switch circuit of the first-stage conversion circuit comprises a first switch circuit, a second switch circuit, a third switch circuit, and a fourth switch circuit which are bridge-connected; and a capacitor is provided on a path between a primary winding of the voltage transformation circuit and the third switch circuit, or on a path between the primary winding of the voltage transformation circuit and the fourth switch circuit, and the capacitor serves as a resonance capacitor.

17. The power supply system as claimed in claim 8, wherein the switch circuit of the first-stage conversion circuit comprises a first switch circuit, a second switch circuit, a third switch circuit, and a fourth switch circuit which are bridge-connected; and when an input alternating-current voltage of the received alternating-current power is in a first voltage range, the first-stage conversion circuit operates in a full-bridge mode, and when the input alternating-current voltage is in a second voltage range, the first-stage conversion circuit operates in a half-bridge mode, wherein a minimum voltage value of the second voltage range is greater than a maximum voltage value of the first voltage range.

18. The circuit control method as claimed in claim 7, wherein a terminal of the switch circuit of the valley-fill circuit is connected with the input terminal of the energy storage circuit and a negative terminal of the first diode, another terminal of the switch circuit is connected with a negative terminal of the second diode and a terminal of the inductor, another terminal of the inductor is connected with a terminal of the at least one filter capacitor, and another terminal of the at least one filter capacitor is connected with another terminal of the energy storage circuit and a positive terminal of the second diode.

19. The power supply system as claimed in claim 8, wherein a terminal of the switch circuit of the valley-fill circuit is connected with the input terminal of the energy storage circuit and a negative terminal of the first diode, another terminal of the switch circuit is connected with a negative terminal of the second diode and a terminal of the inductor, another terminal of the inductor is connected with a terminal of the at least one filter capacitor, and another terminal of the at least one filter capacitor is connected with another terminal of the energy storage circuit and a positive terminal of the second diode.

* * * * *